US012801946B2

(12) United States Patent
Golovnya

(10) Patent No.: US 12,801,946 B2
(45) Date of Patent: Nov. 17, 2026

(54) IDENTIFYING RELEVANCE OF PROCESS INPUTS

(71) Applicant: Minitab, LLC, State College, PA (US)

(72) Inventor: Mykhaylo M. Golovnya, La Mesa, CA (US)

(73) Assignee: Minitab, LLC, State College, PA (US)

( * ) Notice: Subject to any disclaimer, the term of this patent is extended or adjusted under 35 U.S.C. 154(b) by 563 days.

(21) Appl. No.: 18/381,423

(22) Filed: Oct. 18, 2023

(65) Prior Publication Data

US 2025/0131290 A1 Apr. 24, 2025

(51) Int. Cl.
*G06N 5/022* (2023.01)

(52) U.S. Cl.
CPC .................................. *G06N 5/022* (2013.01)

(58) Field of Classification Search
CPC ..................................................... G06N 5/022
See application file for complete search history.

(56) References Cited

U.S. PATENT DOCUMENTS 9,098,326 B1 * 8/2015 Martin .................... G06N 5/02
12,062,168 B2 * 8/2024 Meister ............ G06F 18/24323
2015/0033822 A1 * 2/2015 Crosby .................. G01F 25/20
73/1.82
2016/0292591 A1 * 10/2016 Guirguis ............... G06N 20/20
2022/0075360 A1 * 3/2022 Ito ........................... G06N 5/01
2024/0249158 A1 * 7/2024 Narayanan ............ G06N 20/00
2025/0063144 A1 * 2/2025 Kunishige ............. H04N 7/181
2026/0144831 A1 * 5/2026 Buffington .......... A61K 35/747

FOREIGN PATENT DOCUMENTS

CN 107015579 B * 1/2023 ........... F16F 15/002

OTHER PUBLICATIONS

Bikmukhametov et al. (Combining Machine Learning and Process Engineering Physics Towards Enhanced Accuracy and Explainability of Data-Driven Models, published 2020) (Year: 2020).*

* cited by examiner

*Primary Examiner* — David Yi
*Assistant Examiner* — Syed Rayhan Ahmed

(57) ABSTRACT

Computing an input relevance measure of process inputs by obtaining from a sensor array sensor measurements that relate process inputs to a process output, computing from the sensor measurements, a number of data partitions, building for each data partition of the number of data partitions a corresponding stochastic gradient boosting model, and computing for each process input, a number of partial dependency plots with each partial dependency plot being based on the corresponding stochastic gradient boosting model. The input relevance measure is then computed for each process input based on the number of partial dependency plots of the process input to estimate a degree of change in the process output obtained by varying the process input.

20 Claims, 9 Drawing Sheets

IDENTIFYING RELEVANCE OF PROCESS INPUTS

BACKGROUND

Technical Field

The present disclosure generally relates to identifying the relevance of process inputs, and more particularly, to computing the relevance of inputs tracked by sensors in a system to identify an importance of each sensor in the sensor array and how the sensor affects the process output.

Description of the Related Art

Predictive models may be used to analyze existing systems and processes and make prediction about future outcomes. The predictive models may be generated using collected and aggregated observations to make predictions. One or more dependent (output or response) variables and numerous independent (input or explanatory) variables may be present in a collection of observations. One or more of the independent variables may have more influence on the dependent variable than the remaining independent variables.

BRIEF SUMMARY

According to an embodiment of the present disclosure, a method is disclosed. The method comprises computing an input relevance measure of process inputs by obtaining from a sensor array sensor measurements that relate process inputs to a process output, computing from the sensor measurements, a number of data partitions, building for each data partition of the number of data partitions a corresponding stochastic gradient boosting model, and computing for each process input, a number of partial dependency plots with each partial dependency plot being based on the corresponding stochastic gradient boosting model. The input relevance measure is then computed for each process input based on the number of partial dependency plots of the process input to estimate a degree of change in the process output obtained by varying the process input.

In an aspect, process inputs with a zero or negative input relevance measure may be discarded.

In one aspect, the input relevance measure is computed from the number of partial dependency plots by computing a difference between a maximum confirmed process output of the number of partial dependency plots and a minimum confirmed process output of the number of partial dependency plots.

According to an embodiment of the present disclosure, a system is disclosed. A system includes a sensor array and a processor that is configured to obtain from the sensor array sensor measurements that relate a plurality of process inputs to a process output and compute from the sensor measurements, a number of data partitions. The system then builds for each data partition a corresponding stochastic gradient boosting model and generates for each process input a number of partial dependency plots with each partial dependency plot being based on the corresponding stochastic gradient boosting model. The system then computes for each process input, an input relevance measure that estimates a degree of change in the process output obtained by varying the process input.

According to an embodiment of the present disclosure, a non-transitory computer readable storage medium is disclosed to store a program which, when executed by a computer system, causes the computer system to perform any of the methods described herein.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Overview

Figure 1:
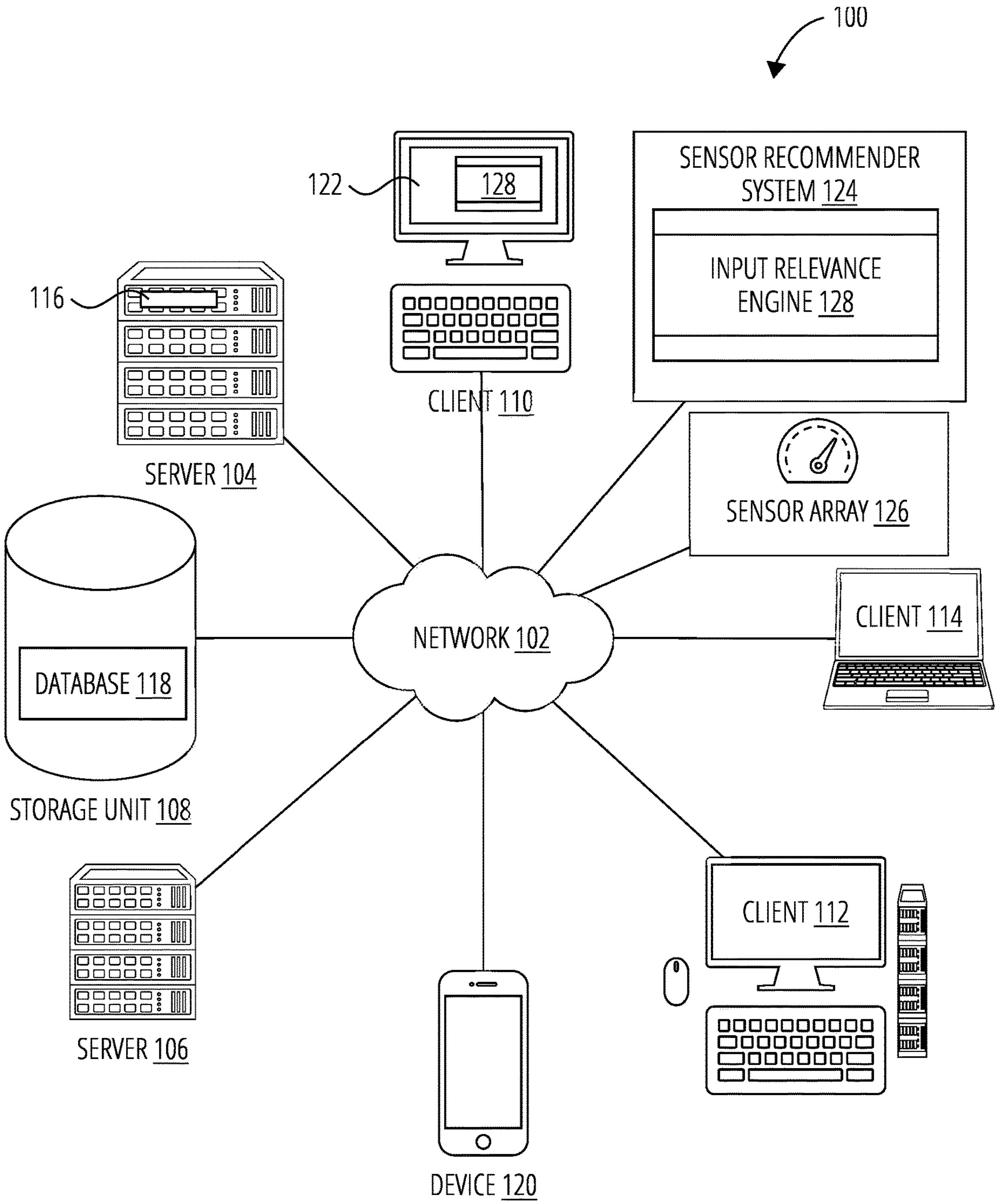
FIG. 1 depicts a block diagram of a network of data processing systems in accordance with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The illustrative embodiments are related to computing relevance inputs to a process performed with the aid of a sensor array. In various industrial processes, it may be beneficial to identify the relevant inputs to ensure that the output of a process is within desired bounds. For example, it may be beneficial to identify which operating parameters of a gas turbine may be used to minimize the environmental impact of the turbine in terms of NOx (nitric oxide, NO and nitrogen dioxide, $NO_2$, the nitrogen oxides that are most relevant for air pollution) emissions. In another example, it may be beneficial to identify which operating parameters of a gas turbine may be used to minimize CO (carbon monoxide) emissions. Generally, identifying which sensors may be monitored in real time to prevent an industrial process from going out of normal operating limits may be not only beneficial but a significantly arduous task due to random noise inputs.

The illustrative embodiments recognize that predictive analytics methods may be utilized to generate models that capture dependency between process inputs and output/response based on historical data. In particular, stochastic gradient boosting models, due to their data driven nature, may capture the nature of the dependencies. Generally, stochastic gradient boosting models may display the nature of univariate and bivariate dependencies as partial dependence plots which may be used to identify which inputs of the process achieve desired objectives. However, due to the "greedy" nature of such models, they may accommodate both signal and random noise inputs, thus, introducing hazards including exaggeration of a degree of change expected from controlling a specific process input as well as the suggested nature of dependencies on the given input being a meaningless random pattern.

The illustrative embodiments identify a relevant subset of influential process inputs and provide realistic (conservative) estimates of the degree of change expected in the process output due to varying the inputs. The illustrative embodiments compute an input relevance measure of process inputs by obtaining from a sensor array, sensor measurements that relate the process inputs to a process output. The illustrative embodiments compute from the sensor measurements, a number of data partitions, building for each data partition of the number of data partitions a corresponding stochastic gradient boosting model, and computing for each process input, a number of partial dependency plots with each partial dependency plot being based on the corresponding stochastic gradient boosting model. The illustrative embodiments then compute an input relevance measure for each process input, using the number of partial dependency plots of the process input, to estimate a degree of change in the process output obtained by varying the process input.

The methods described herein are significantly beneficial in their estimation richness, veracity, and noise impact reduction, especially for their elimination or at least reduction of data-induced uncertainty inherent to Stochastic Gradient Boosting models due to arbitrariness of a single round of train-test partition. An embodiment can be implemented as a software and/or hardware application. The application implementing an embodiment can be configured as a modification of an existing system, as a separate application that operates in conjunction with an existing system, a standalone application, or some combination thereof.

This manner of computing input relevance measures is unavailable in the presently available methods in the technological field of endeavor pertaining to processes involving the real-time measurement and monitoring of sensor arrays such as manufacturing and other industrial applications. A method of an embodiment described herein, when implemented to execute on a device or data processing system, comprises substantial advancement of the computational functionality of that device or data processing system in configuring the performance of a monitoring platform.

The illustrative embodiments are described with respect to certain types of machines developing statistical and predictive analytic models based on data records obtained from sensor measurements or data. The illustrative embodiments are also described with respect to other scenes, subjects, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
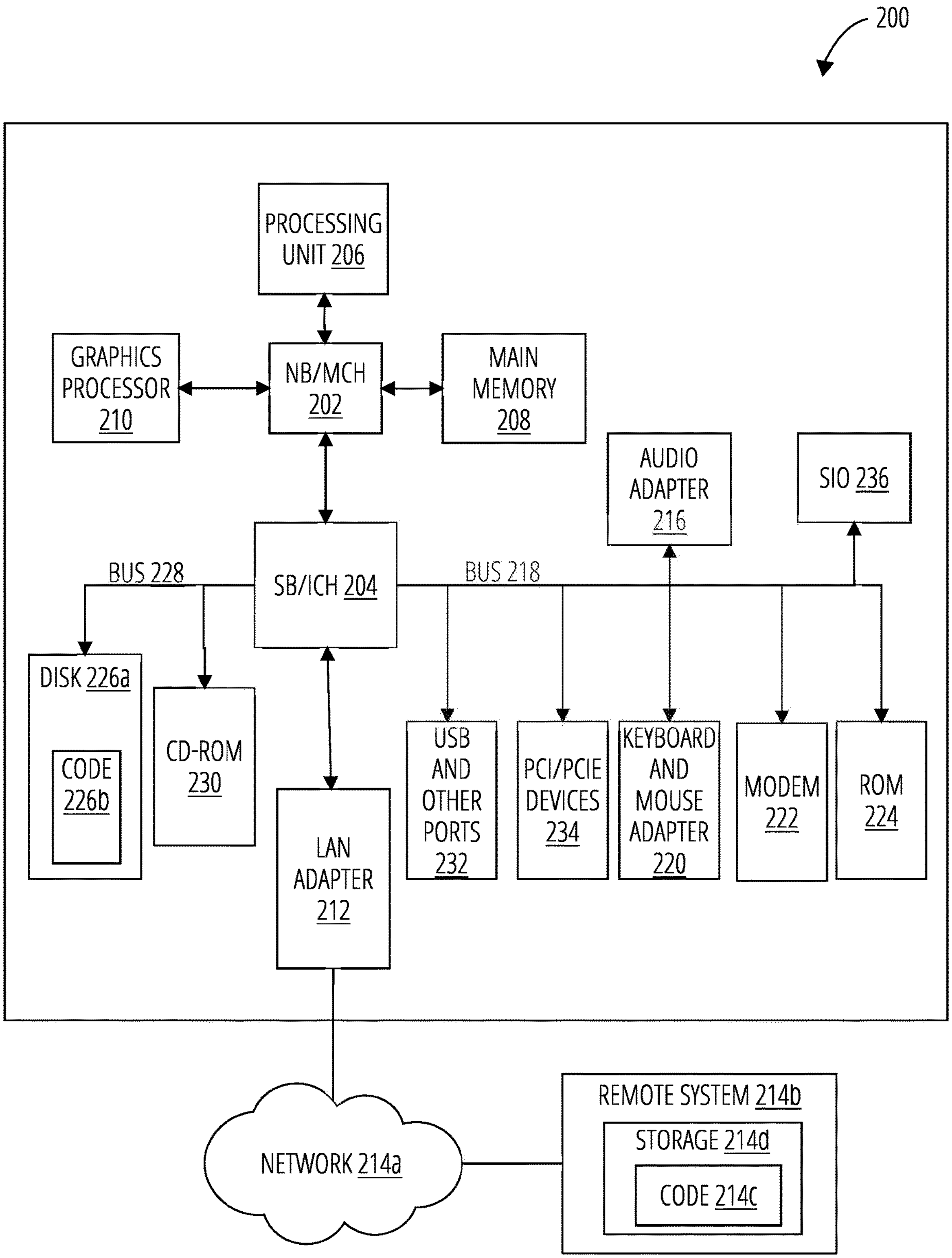
FIG. 2 depicts a block diagram of a data processing system in accordance with an illustrative embodiment.

With reference to the figures and in particular with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 110, client 112, client 114 are also coupled to network 102. A data processing system, such as server 104 or server 106, or clients (client 110, client 112, client 114) may contain data and may have software applications or software tools executing thereon. Server 104 may include one or more GPUs (graphics processing units) for training one or more models.

Only as an example, and without implying any limitation to such architecture, FIG. 1 depicts certain components that are usable in an example implementation of an embodiment. For example, servers and clients are only examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems (server 104, server 106, client 110, client 112, client 114) also represent example nodes in a cluster, partitions, and other configurations suitable for implementing an embodiment.

Device 120 is an example of a device described herein. For example, device 120 can take the form of a smartphone, a special purpose fabrication platform, a tablet computer, a laptop computer, client 110 in a stationary or a portable form, a wearable computing device, or any other suitable device. Any software application described as executing in another data processing system in FIG. 1 can be configured to execute in device 120 in a similar manner. Any data or information stored or produced in another data processing system in FIG. 1 can be configured to be stored or produced in device 120 in a similar manner.

Input relevance engine 128 may execute as part of sensor recommender system 124, client application 122, server application 116 or on any data processing system herein. Input relevance engine 128 may also execute as a cloud service communicatively coupled to system services, hardware resources, or software elements described herein. Input relevance engine 128 may be operable to compute an input relevance measure of process inputs in a desired process. Sensor recommender system 124 may recommend one or more sensors of a sensor array 126 to monitor in real time to prevent an industrial process from going out of normal/desired operating limits. Database 118 of storage unit 108 stores one or more measurements or data in repositories for computations herein.

Server application 116 implements an embodiment described herein. Server application 116 can use data from storage unit 108 for computations herein. Server application 116 can also obtain data from any client for computations. Server application 116 can also execute in any of data processing systems (server 104 or server 106, client 110, client 112, client 114), such as client application 122 in client 110 and need not execute in the same system as server 104.

Server 104, server 106, storage unit 108, client 110, client 112, client 114, device 120 may couple to network 102 using wired connections, wireless communication protocols, or other suitable data connectivity. Client 110, client 112 and client 114 may be, for example, personal computers or network computers.

In the depicted example, server 104 may provide data, such as boot files, operating system images, and applications to client 110, client 112, and client 114. Client 110, client 112 and client 114 may be clients to server 104 in this example. Client 110, client 112 and client 114 or some combination thereof, may include their own data, boot files, operating system images, and applications. Data processing environment 100 may include additional servers, clients, and other devices that are not shown. Server 104 includes a server application 116 that may be configured to implement one or more of the functions described herein in accordance with one or more embodiments.

Server 106 may include a configuration to gather sensor array measurements and store the measurements in database 118 for automatic computation of input relevance measures.

An operator of the sensor recommender system 124 can include individuals, computer applications, and electronic devices. The operators may employ the input relevance engine 128 of the sensor recommender system 124 to make predictions or decisions. An operator may desire that the input relevance engine 128 perform methods to satisfy a predetermined evaluation/relevance criteria. The operator may be a processor or a person or both.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as server 104, server 106, or client 110, client 112, client 110, sensor recommender system 124 in FIG. 1, or another type of device in which computer usable program code or instructions implementing the processes may be located for the illustrative embodiments.

Data processing system 200 is also representative of a data processing system or a configuration therein, such as device 120 in FIG. 1 in which computer usable program code or instructions implementing the processes of the illustrative embodiments may be located. Data processing system 200 is described as a computer only as an example, without being limited thereto. Implementations in the form of other devices, such as device 120 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to North Bridge and memory controller hub (NB/MCH) 202 through an accelerated graphics port (AGP) in certain implementations.

In the depicted example, local area network (LAN) adapter 212 is coupled to South Bridge and input/output (I/O) controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and input/output (I/O) controller hub (SB/ICH) 204 through bus 218. Hard disk drive (HDD) or solid-state drive (SSD) 226*a* and CD-ROM 230 are coupled to South Bridge and input/output (I/O) controller hub (SB/ICH) 204 through bus 228. PCI/PCIe devices 234 may include, for example, Ethernet adapters, add-in cards, and PC cards for notebook computers. PCI uses a card bus controller, while PCIe does not. Read only memory (ROM) 224 may be, for example, a flash binary input/output system (BIOS). Hard disk drive (HDD) or solid-state drive (SSD) 226*a* and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and input/output (I/O) controller hub (SB/ICH) 204 through bus 218.

Memories, such as main memory 208, read only memory (ROM) 224, or flash memory (not shown), are some examples of computer usable storage devices. Hard disk drive (HDD) or solid-state drive (SSD) 226*a*, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as server application 116 and client application 122 in FIG. 1, are located on storage devices, such as in the form of codes 226*b* on Hard disk drive (HDD) or solid-state drive (SSD) 226*a*, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory (ROM) 224, or in one or more peripheral devices.

Furthermore, in one case, code 226*b* may be downloaded over network 214*a* from remote system 214*b*, where similar code 214*c* is stored on a storage device 214*d* in another case, code 226*b* may be downloaded over network 214*a* to remote system 214*b*, where downloaded code 214*c* is stored on a storage device 214*d*.

The hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub (NB/MCH) 202. A processing unit may include one or more processors or CPUs.

The depicted examples in FIG. 1 and FIG. 2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and Hard disk drive (HDD) or solid-state drive (SSD) 226*a* is manifested as a virtualized instance of all or some portion of Hard disk drive (HDD) or solid-state drive (SSD) 226*a* that may be available in the host data processing system. The host data processing system in such cases is represented by data processing system 200.

Figure 3:
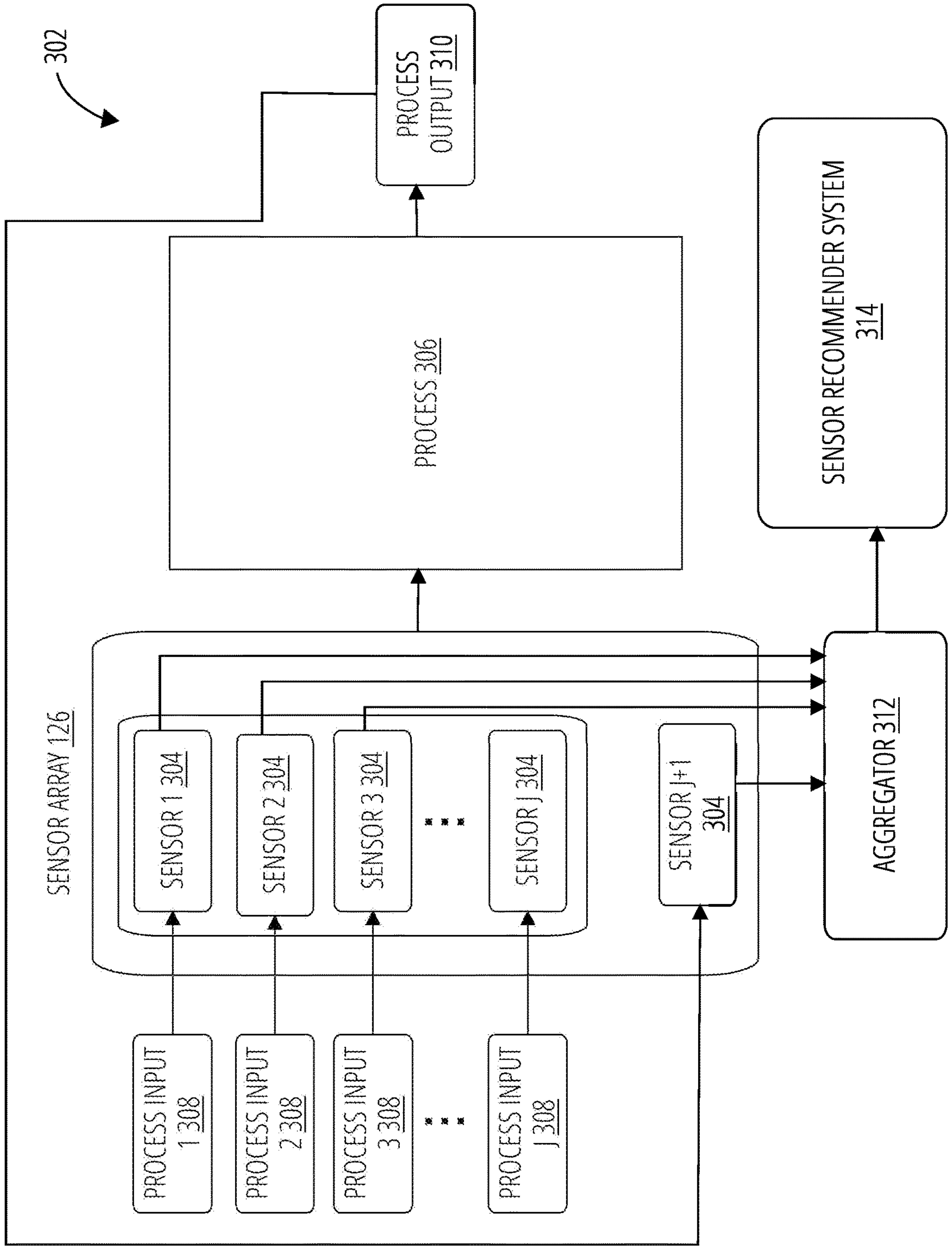
FIG. 3 depicts a block diagram of a system for identifying a relevance of process inputs in accordance with an illustrative embodiment.

Turning now to FIG. 3, a block diagram of a system 302 for identifying a relevance of process inputs is illustrated. The system comprises a sensor array 126 comprising a plurality of sensors 304, a plurality of process inputs 308 for a process 306, one or more process outputs 310, an aggregator 312 for aggregating the sensor measurements from the sensor array 126, and a sensor recommender system 314 that recommends one or more sensors 304 to monitor in real time to prevent an industrial process from going out of predetermined operating limits.

Figure 4:
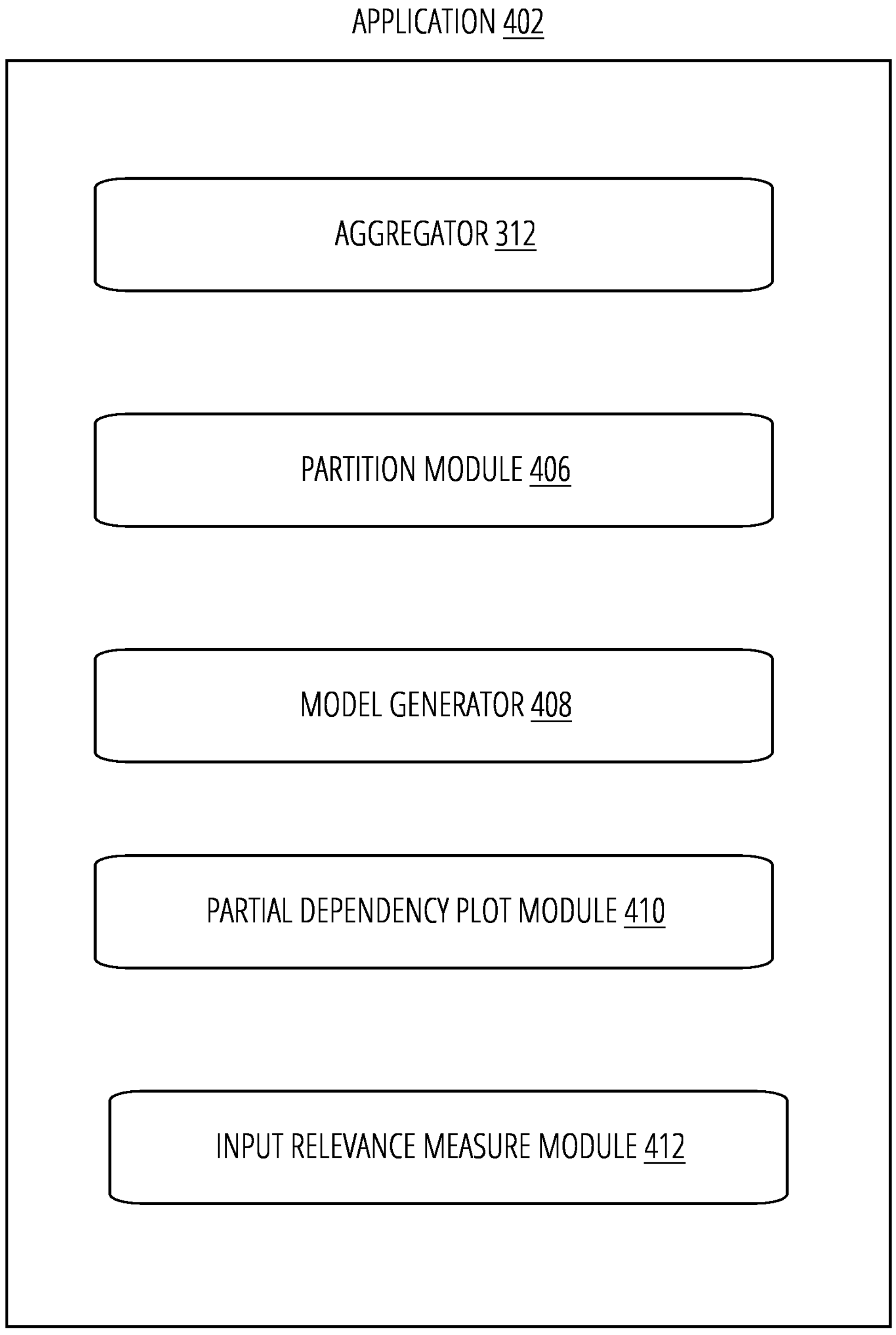
FIG. 4 depicts a block diagram of an application in accordance with an illustrative embodiment.
Figure 5A:
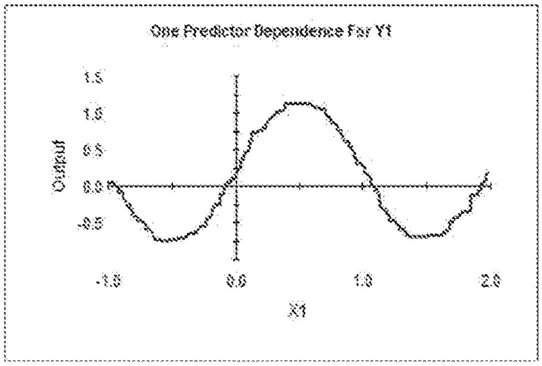
FIG. 5A depicts a single partial dependency plot in accordance with an illustrative embodiment.
Figure 5B:
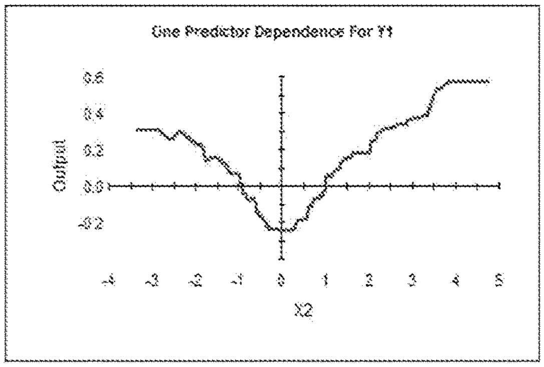
FIG. 5B depicts a single partial dependency plot in accordance with an illustrative embodiment.
Figure 5C:
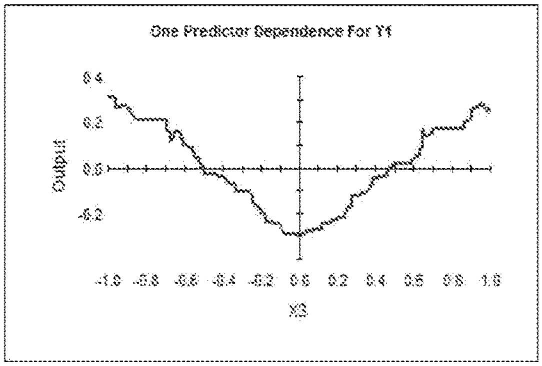
FIG. 5C depicts a single partial dependency plot in accordance with an illustrative embodiment.
Figure 5D:
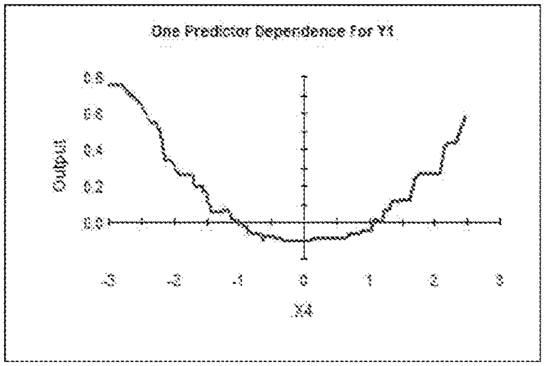
FIG. 5D depicts a single partial dependency plot in accordance with an illustrative embodiment.
Figure 5E:
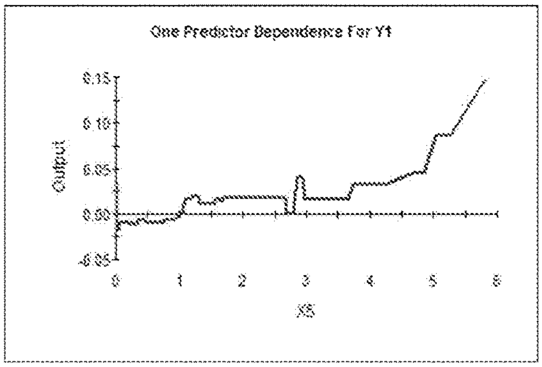
FIG. 5E depicts a single partial dependency plot in accordance with an illustrative embodiment.
Figure 5F:
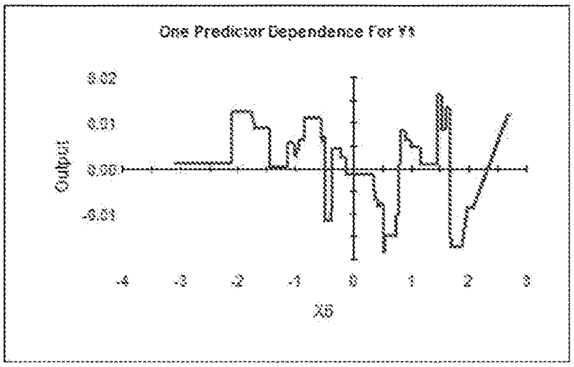
FIG. 5F depicts a single partial dependency plot in accordance with an illustrative embodiment.
Figure 5G:
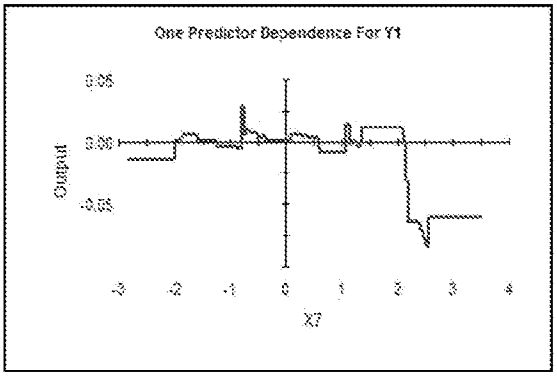
FIG. 5G depicts a single partial dependency plot in accordance with an illustrative embodiment.
Figure 5H:
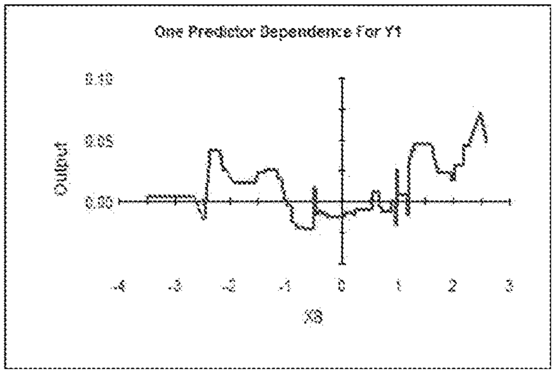
FIG. 5H depicts a single partial dependency plot in accordance with an illustrative embodiment.
Figure 5I:
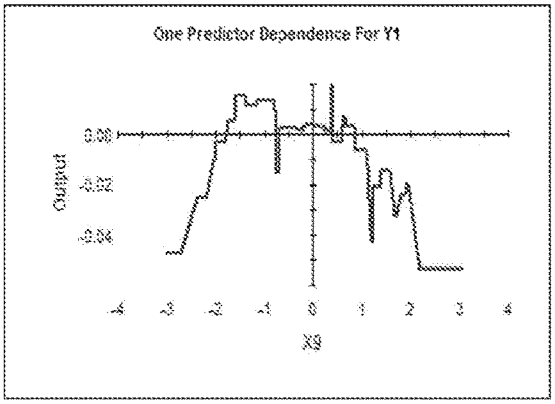
FIG. 5I depicts a single partial dependency plot in accordance with an illustrative embodiment.
Figure 5J:
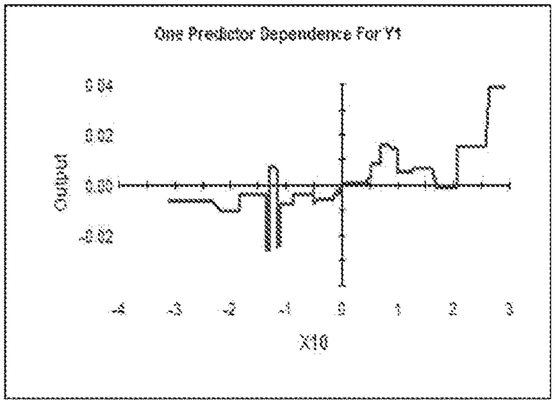
FIG. 5J depicts a single partial dependency plot in accordance with an illustrative embodiment.
Figure 6A:
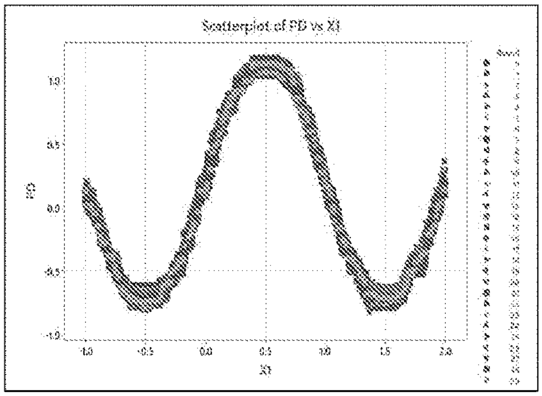
FIG. 6A depicts a first number of partial dependency plot in accordance with an illustrative embodiment.
Figure 6B:
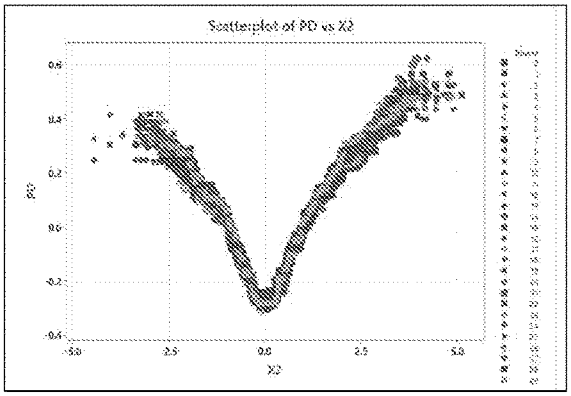
FIG. 6B depicts a first number of partial dependency plot in accordance with an illustrative embodiment.
Figure 6C:
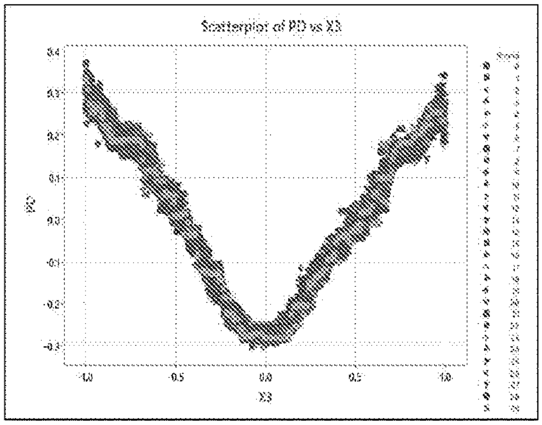
FIG. 6C depicts a first number of partial dependency plot in accordance with an illustrative embodiment.
Figure 6D:
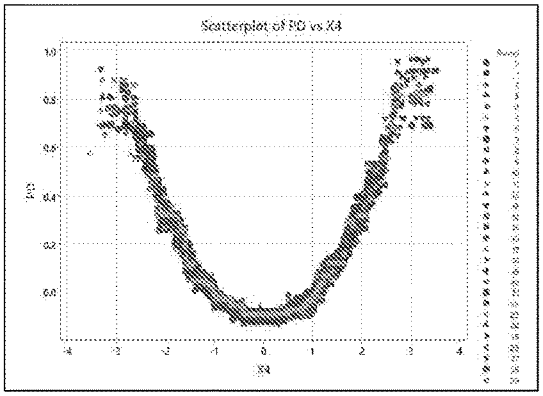
FIG. 6D depicts a first number of partial dependency plot in accordance with an illustrative embodiment.
Figure 6E:
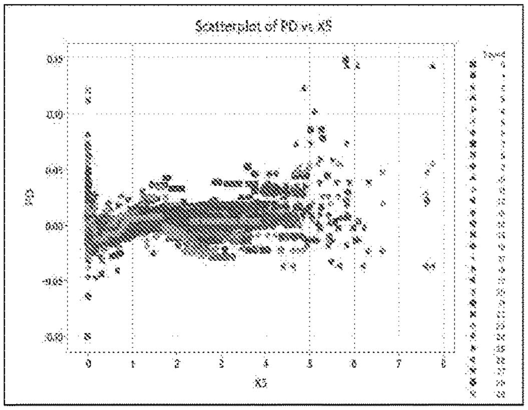
FIG. 6E depicts a first number of partial dependency plot in accordance with an illustrative embodiment.
Figure 6F:
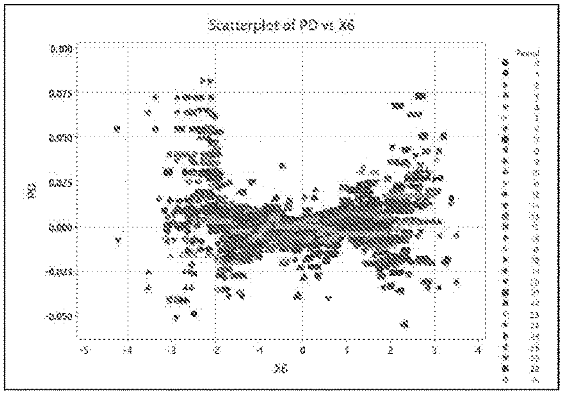
FIG. 6F depicts a first number of partial dependency plot in accordance with an illustrative embodiment.
Figure 6G:
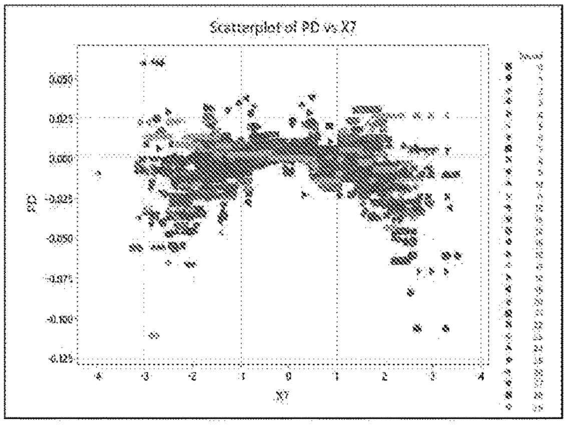
FIG. 6G depicts a first number of partial dependency plot in accordance with an illustrative embodiment.
Figure 6H:
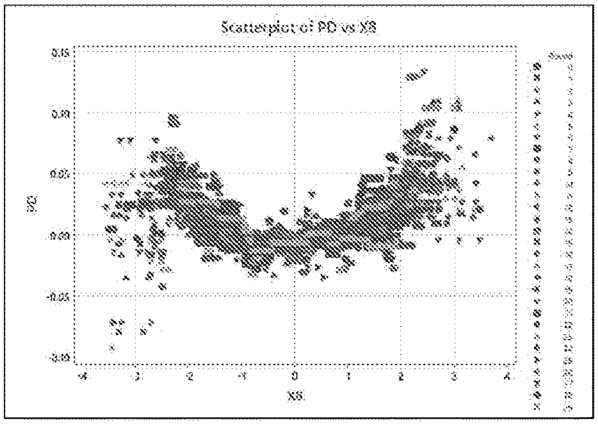
FIG. 6H depicts a first number of partial dependency plot in accordance with an illustrative embodiment.
Figure 6I:
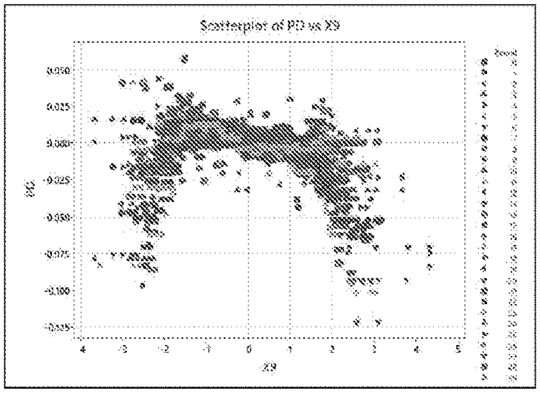
FIG. 6I depicts a first number of partial dependency plot in accordance with an illustrative embodiment.
Figure 6J:
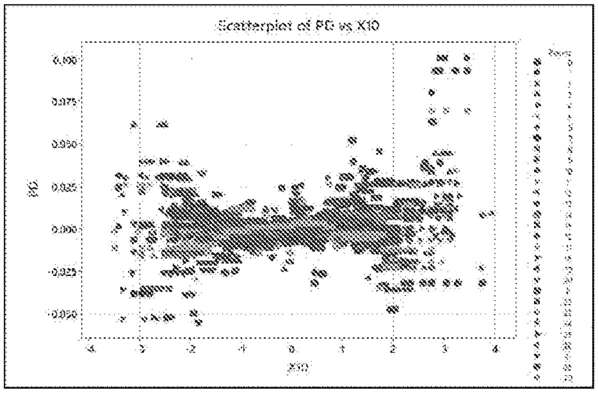
FIG. 6J depicts a first number of partial dependency plot in accordance with an illustrative embodiment.

More specifically, an operator may desire to identify relevant inputs to ensure that the output of a process is within the predetermined bounds. Further, the operator may desire to identify limits in which process inputs 308 may be pushed taking into consideration the effect on a corresponding process output 310. The system 302 may be used by the operator to compute an estimate of the degree of change expected in the process output 310 from varying the set of process inputs 308. The system 302 of FIG. 3 may work in conjunction with the application 402 of FIG. 4 which may be an example of input relevance engine 128, sensor recommender system 124, server application 116 or client application 122 of FIG. 1

The application 402 comprises an aggregator 312, a partition module 406, a model generator 408, a partial dependency plot module 410, and an input relevance measure module 412. The application 402 may be configured to employ the sensor array 126, and a processor to obtain from the sensor array 126 a plurality of sensor measurements that relate the process inputs 308 to the process output 310. More specifically, the application 402 may collect, via aggregator 312 a working set (WorkingSet) of historical process measurements, including J process inputs 308 ($ProcessInput_j$) and a process output 310 (ProcessOutput). The individual measurements may be obtained from various sensors 304 of the sensor array 126, as well as stored sensor measurements such as stored electronic records, archived documents, and other tangible records.

Responsive to obtaining the measurements, the partition module 406 may be operable to create a first number, P, of Train/Test random partitions ($Partition_p$) of the WorkingSet. The random partitions may be, for example, P 50/50 random partitions (i.e., each partition has 50% of the data as part of a training dataset and 50% as part of a test subset), each of the P 50/50 random partitions using all of the data in the measurement data/WorkingSet. For example, thirty 50/50 random partitions of the measurement data may be generated with each random partition being randomly different from one another. Of course, this is not meant to be limiting as other examples such 70/30 and 80/20, etc may be obtained in view of the descriptions herein. Further each random partition is also unique. In an aspect herein, the data partitioning may be performed using random split into two mutually exclusive Train and Test samples. Alternatively, bootstrap sampling with replacement can be used to obtain Train (in bag) and Test (out of bag) samples.

Upon obtaining the data partitions, the model generator 408 may be operable to generate, for each partition of the P partitions, a stochastic gradient boosting model $M_p$ to predict the process output 310 (ProcessOutput) using $Train_p$ as the training sample, $Test_p$ as the test sample, and predictors $X_j$, j=1, . . . , J, wherein J is the number of process inputs 308. Thus, P stochastic gradient boosting models may be obtained. The illustrative embodiments recognize that the stochastic gradient boosting algorithms, which are data driven, have the ability to capture dependencies and display the nature of the dependencies as partial dependence plots. Stochastic gradient boosting is a powerful machine learning technique that may be used for regression and classification tasks. It is an ensemble learning method that combines the predictions of multiple weak learners, typically decision trees, to create a strong predictive model. By introducing randomness into the training process, improvements may be observed in both the accuracy and efficiency of the model. Generally, stochastic gradient boosting comprises gradient boosting which may builds an ensemble model by sequentially adding "weak learners" to correct the errors made by the previous ones. The technique minimizes a loss function (typically mean squared error for regression or logistic loss for binary classification) by iteratively fitting new weak learners to the residuals of the previous ones. Stochastic gradient boosting may also comprise stochastic gradient descent (SGD) which determines the minimum of a loss function. This introduces randomness into the training process. In stochastic gradient boosting, the stochasticity of SGD may be applied to the gradient boosting algorithm. During each iteration of the boosting process, a random subset of the training data and/or available predictors is sampled to train the weak learner. This randomness may help prevent overfitting and improve statistical performance of the resulting model.

In an aspect herein, to differentiate between signals and noise further computations may be performed as described herein. The partial dependency plot module 410 may be operable to compute for each process input 308 ($ProcessInput_j$) P partial dependency plots ($Plots_j$). More specifically, the partial dependency plot module 410 may extract for each process input 308 a matrix of plots $Plot_{jp}$, j=1, . . . , J, p=1, . . . P, wherein "$Plot_{jp}$" represents each partial dependency plot of predictor $X_j$ generated by model $M_p$. The input relevance measure for each process input 308 is then computed from the matrix of plots of each process input 308 by computing a difference between a maximum confirmed process output and a minimum confirmed process output using the matrix of plots.

The input relevance measure module 412 may be operable to compute values of input relevance measures of each process input 308. More specifically, for predictor $X_j$, an upper bound and a lower bound may be computed from the P partial dependency plots corresponding to the predictor $X_j$ and a difference between the upper bound and lower bound determined to depict the input relevance measure. For each predictor $X_j$, the upper bound may be computed as:

$$U\_bound_j = Max_{range(Xj)}[Min_p(Plot_{jp})].$$

Further, for each predictor $X_j$, the lower bound may be computed as:

$$L\_bound_j = Max_{range(Xj)}[Min_p(Plot_{jp})].$$

The difference, $\Delta_j$=U_bound$_j$–L_bound$_j$, and this represents the input relevance measure that estimates a degree of change in the process output obtained by varying the corresponding process input. In other words, U_bound$_j$ may be the maximum of the minimum values of the P partial dependency plots, i.e., the maximum confirmed output. L_bound$_j$ may be the minimum of the maximum values of the P partial dependency plots, i.e., the minimum confirmed output. Due to the bounds being confirmed, the difference between the two signifies a conservative estimate, and thus a high degree of reliability regarding how a change in the process input 308 changes the process output 310.

In as aspect, responsive to the computed input relevance measure being positive, it may be concluded that Predictor $X_j$ can account for at least $\Delta_j$ difference in the model response. Further, responsive to the computed input relevance measure being zero or negative, it may be concluded that there is no evidence that the predictor $X_j$ makes a significant difference in the model response. Even further, the higher the value of the computed input relevance measure, the higher the influence of the Predictor $X_j$ on the model response.

FIG. 5A-FIG. 5J illustrate a simulated dataset of an industrial application depicting single partial dependency plots wherein the simulated dataset contains 10,000 observations from sensor array 126 that use four continuous inputs $X_1$, . . . $X_4$ to produce a non-linear output response $Y_1$ with the 9/1 signal to noise ratio. Thus, the expected best model performance may be about 90% R-squared. Six random inputs $X_5$, . . . $X_{10}$ that are known to make no contribution to the output were then added and a gradient boosting algorithm used to identify which predictors are influential and which predictors are noise. As expected, a single gradient boosting model, due to its greedy nature, picks up all 10 predictors and generates the ten single partial dependency plots shown in FIG. 5A-FIG. 5J.

From the single partial dependency plots shown in FIG. 5A-FIG. 5J a maximum degree of influence, i.e., a possible range of change in the predicted response attributed to each input may be computed as shown in Table. 1.

TABLE 1

Predictor vs Response Range of Change

| Predictor | Response Range of Change |
|---|---|
| $X_1$ | 1.8 |
| $X_2$ | 0.8 |
| $X_3$ | 0.7 |
| $X_4$ | 0.9 |
| $X_5$ | 0.17 |
| $X_6$ | 0.03 |
| $X_7$ | 0.12 |
| $X_8$ | 0.1 |
| $X_9$ | 0.06 |
| $X_{10}$ | 0.06 |

While a first operator may suspect that inputs $X_5$-$X_{10}$ are not relevant, there may be no definitive confirmation of this hypothesis. A second operator may conclude erroneously that input $X_5$ can be used to meaningfully control the output.

In an aspect herein a plurality of partial dependency plots may be computed for each input using the 10,000 observations from the industrial application which were partitioned into thirty 50/50 simple random partition iterations. Thus, thirty partial dependency plots were obtained for each input $X_1$-$X_{10}$ as shown in FIG. 6A-FIG. 6J with each figure depicting thirty superimposed plots that vary slightly from each other.

By employing the input relevance engine 128 to compute the input relevance measure for each input using superimposed process outputs shown in the plots, a more accurate degree of change attributable to the inputs was obtained. Table. 2 compares the Response Range of Change based on the single partial dependency plots to the input relevance measures based on the plurality of partial dependency plots generated using the plurality of random partitions.

TABLE 2

Predictor vs Response Range of Change (Single) vs Input Relevance Measure

| Predictor | Response Range of Change (Single Model) | Input Relevance Measure |
|---|---|---|
| $X_1$ | 1.8 | 1.6 |
| $X_2$ | 0.8 | 0.65 |
| $X_3$ | 0.7 | 0.45 |
| $X_4$ | 0.9 | 0.8 |
| $X_5$ | 0.17 | −0.04 |
| $X_6$ | 0.03 | −0.01 |
| $X_7$ | 0.12 | −0.02 |
| $X_8$ | 0.1 | 0 |
| $X_9$ | 0.06 | −0.05 |
| $X_{10}$ | 0.06 | −0.04 |

As can be seen in Table. 2, the input relevance measures for $X_1$-$X_4$ are positive and non-zero whereas the input relevance measures for $X_5$-$X_{10}$ are zero and or negative. Thus, unlike the Response Range of Change obtained using the single model, the input relevance engine 128 may be operable to obtain more accurate and realistic (conservative) estimates of the expected degree of change associated with each influential input. The sensor recommender system 124 then recommends sensors 1-4 of a sensor array 126 as the sensors to monitor in real time to prevent an industrial process from going out of normal/desired operating limits. The sensor recommender system 124 may alternatively recommend sensor 1 as the sensor to monitor in real time due to the corresponding input relevance measure being the highest. Generally, a predetermined threshold may be used to select which sensors to monitor. Even further, knowing the input relevance measures may enable an operator to determine the extent to which process inputs may be altered without causing the process output to exceed a predetermined range.

Figure 7:
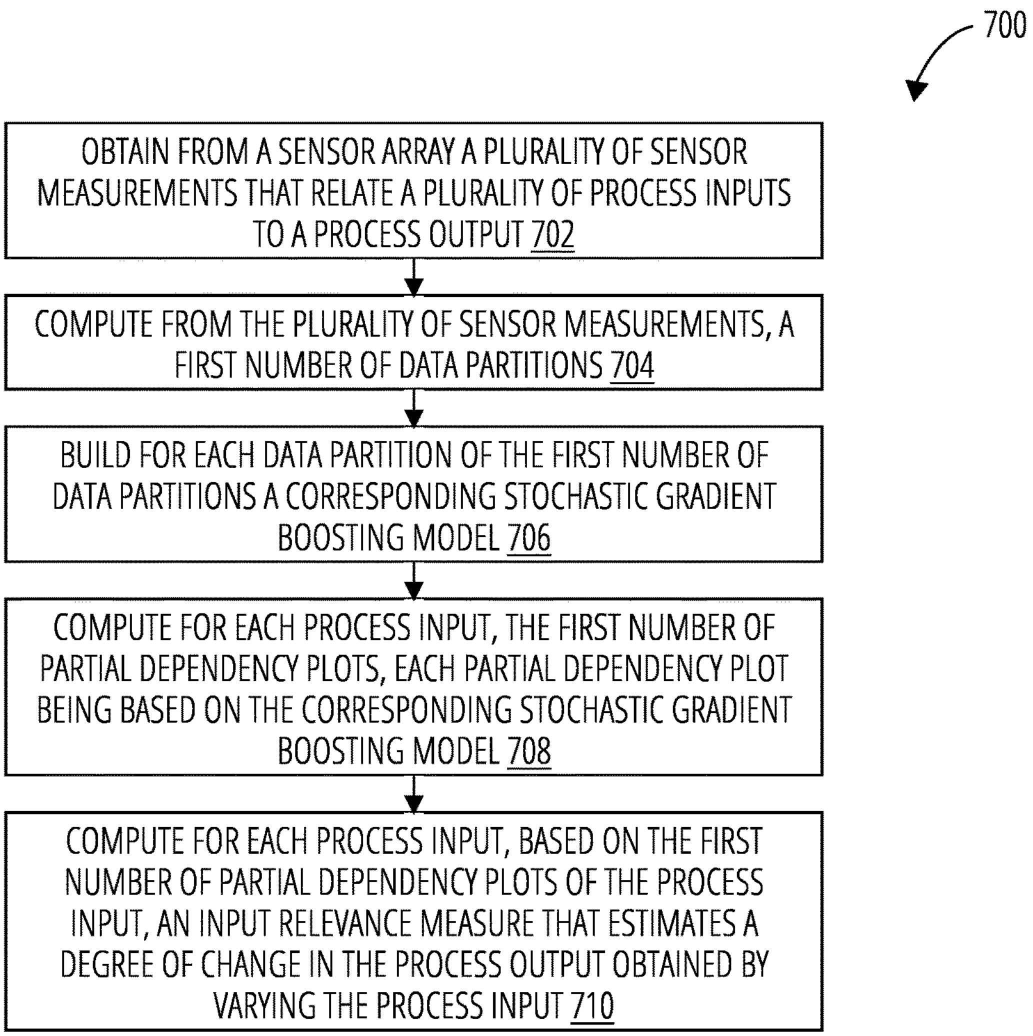
FIG. 7 depicts a routine in accordance with an illustrative embodiment.

FIG. 7 depicts a routine 700 for computing the input relevance measures of one or more process inputs 308 measured by sensors of a sensor array 126. In block 702, the input relevance engine 128 may obtain from the sensor array 126 a plurality of sensor measurements that relate the plurality of process inputs 308 to a process output 310. There may be one or more process outputs. In block 704, the input relevance engine 128 may compute from the plurality of sensor measurements, a first number, P, of data partitions. In block 706, the input relevance engine 128 may build for each data partition of the first number of data partitions a corresponding stochastic gradient boosting model. In block 708, the input relevance engine 128 may compute for each process input 308, the first number, P, of partial dependency plots, each partial dependency plot being based on the corresponding stochastic gradient boosting model. In block 710, the input relevance engine 128 may compute for each process input 308, based on the first number of partial dependency plots of the process input 308, an input relevance measure that estimates a degree of change in the process output obtained by varying the process input.

In an aspect, process input 308 with a zero or negative input relevance measure may be disregarded. In another aspect, the first number, P is 30. Of course, this is not meant to be limiting as other number of partitions may be obtained, such as a number between 10 and 100 with a computational being directly proportional to the number. In another aspect, the routine 700 may be performed automatically. The routine 700 may be applicable to various industrial processes, manufacturing processes, and in general processes involving integrated sensors used for measuring and monitoring the inputs and outputs of the process. For example, the routine 700 may be used to identify which operating conditions can be focused on to reduce the NOx and CO emissions and to what extent. In another example, the routine 700 may be used to for predictive maintenance such as to predict equipment failures, forecast energy consumption in energy-intensive industries and predict the effectiveness of potential drug candidates by analyzing chemical properties and biological data to accelerate drug discovery.

Any specific manifestations of these and other similar example processes are not intended to be limiting to the invention. Any suitable manifestation of these and other similar example processes can be selected within the scope of the illustrative embodiments.

Thus, a computer implemented method, system or apparatus, and computer program product are provided in the illustrative embodiments for computing a relevance of process inputs and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (Saas) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser, or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a dedicated system or user's computer, partly on the user's computer or dedicated system, as a stand-alone software package, partly on the user's computer and partly on a remote computer or entirely on the remote computer or server, etc. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

What is claimed is:

1. A computer-implemented method for identifying relevance of a plurality of process inputs of an industrial process, the method comprising:

obtaining, by a sensor recommender system from a sensor array, a plurality of sensor measurements that relate the plurality of process inputs to a process output;

computing from the plurality of sensor measurements, a first number of random data partitions that are different from one another;

building for each random data partition of the first number of random data partitions a corresponding stochastic gradient boosting model;

computing for each process input of the plurality of process inputs, a first number of partial dependency plots, each of the first number of partial dependency plots being generated based on a respective one of the corresponding stochastic gradient boosting models; and computing for each process input of the plurality of process inputs, based on the first number of partial dependency plots of the process input, an input relevance measure that estimates a degree of change in the process output obtained by varying the respective process input, wherein the input relevance measure is computed by computing a difference between a maximum confirmed process output and a minimum confirmed process output determined from the first number of partial dependency plots; and selecting, based on the input relevance measures, one or more sensors of the plurality of sensors having a corresponding input relevance measure that exceeds a predetermined threshold, and monitoring, in real time, the one or more selected sensors and adjusting at least one of the plurality of process inputs in response to the one or more monitored sensors to maintain the process output within a predetermined operating limit.

2. The method of claim 1, further comprising:

discarding one or more process inputs with a zero or negative input relevance measure.

3. The method of claim 1, further comprising:

computing by the sensor recommender system, one or more sensors of the sensor array that influence the process output by determining sensors with a corresponding input relevance measure greater than zero.

4. The method of claim 1, further comprising:

computing by the sensor recommender system, one or more sensors of the sensor array that influences the process output by at least a predetermined degree.

5. The method of claim 1, wherein the plurality of sensor measurements include process input sensor measurements and process output sensor measurements.

6. The method of claim 1, wherein the first number of random data partitions is from 10-100.

7. The method of claim 1, wherein the computing of the input relevance measure is performed automatically by the sensor recommender system.

8. The method of claim 1, wherein the maximum confirmed process output is computed as a maximum, over a range of values of a corresponding process input, of minimum values of the first number of partial dependency plots.

9. The method of claim 8, wherein the minimum confirmed process output is computed as a minimum, over the range of values of the corresponding process input, of maximum values of the first number of partial dependency plots.

10. A system for identifying relevance of a plurality of process inputs of an industrial process, the system comprising:

a sensor array; and a processor of a sensor recommender system, the processor being configured to:

obtain, by the sensor recommender system from the sensor array, a plurality of sensor measurements that relate the plurality of process inputs to a process output;

create from the plurality of sensor measurements, a first number of random data partitions that are different from one another;

build for each random data partition of the first number of random data partitions a corresponding stochastic gradient boosting model;

compute for each process input of the plurality of process inputs, a first number of partial dependency plots, each of the plurality of partial dependency plots being generated based on a respective one of the corresponding stochastic gradient boosting models; and compute, for each process input of the plurality of process inputs, based on the first number of partial dependency plots of the process input, an input relevance measure that estimates a degree of change in the process output obtained by varying the respective process input, wherein the input relevance measure is computed by computing a difference between a maximum confirmed process output and a minimum confirmed process output determined from the first number of partial dependency plots; and select, based on the input relevance measures, one or more sensors of the plurality of sensors having a corresponding input relevance measure that exceeds a predetermined threshold, and monitor, in real time, the one or more selected sensors and adjust at least one of the plurality of process inputs in response to the one or more monitored sensors to maintain the process output within a predetermined operating limit.

11. The system of claim 10, wherein the processor is further configured to:

discard one or more process inputs with a zero or negative input relevance measure.

12. The system of claim 10, wherein the processor is further configured to:

compute by the sensor recommender system, one or more sensors of the sensor array that influence the process output by determining sensors with a corresponding input relevance measure greater than zero.

13. The system of claim 10, wherein the processor is further configured to:

compute by the sensor recommender system, one or more sensors of the sensor array that influences the process output by at least a predetermined degree.

14. The system of claim 10, wherein the plurality of sensor measurements include process input sensor measurements and process output sensor measurements.

15. The system of claim 10, wherein the processor is further configured to automatically compute the input relevance measure.

16. The system of claim 10, wherein the processor is further configured to compute the maximum confirmed process output as a maximum, over a range of values of a corresponding process input, of minimum values of the first number of partial dependency plots.

17. The system of claim 16, wherein the processor is further configured to compute the minimum confirmed process output as a minimum, over the range of values of the corresponding process input, of maximum values of the first number of partial dependency plots.

18. A non-transitory computer-readable storage medium storing a program which, when executed by a computer system, causes the computer system to:

obtain, by a sensor recommender system from a sensor array a plurality of sensor measurements that relate a plurality of process inputs of an industrial process to a process output;

create from the plurality of sensor measurements, a first number of random data partitions that are different from one another;

build, for each random data partition of the first number of random data partitions, a corresponding stochastic gradient boosting model;

compute for each process input of the plurality of process inputs, a first number of partial dependency plots of the process input, each of the plurality of partial dependency plots being generated based on a respective one of the corresponding stochastic gradient boosting model; and compute for each process input of the plurality of process inputs, based on the first number of partial dependency plots of the process input, an input relevance measure that estimates a degree of change in the process output obtained by varying the respective process input, wherein the input relevance measure is computed by computing a difference between a maximum confirmed process output and a minimum confirmed process output determined from the first number of partial dependency plots; and select, based on the input relevance measures, one or more sensors of the plurality of sensors having a corresponding input relevance measure that exceeds a predetermined threshold, and monitor, in real time, the one or more selected sensors and adjust at least one of the plurality of process inputs in response to the one or more monitored sensors to maintain the process output within a predetermined operating limit.

19. The non-transitory computer-readable storage medium of claim 18, wherein the plurality of sensor measurements include process input sensor measurements and process output sensor measurements.

20. The non-transitory computer-readable storage medium of claim 18, wherein the maximum confirmed process output is computed as a maximum, over a range of values of a corresponding process input, of minimum values of the first number of partial dependency plots, and wherein the minimum confirmed process output is computed as a minimum, over the range of values of the corresponding process input, of maximum values of the first number of partial dependency plots.

* * * * *